Figure 1:
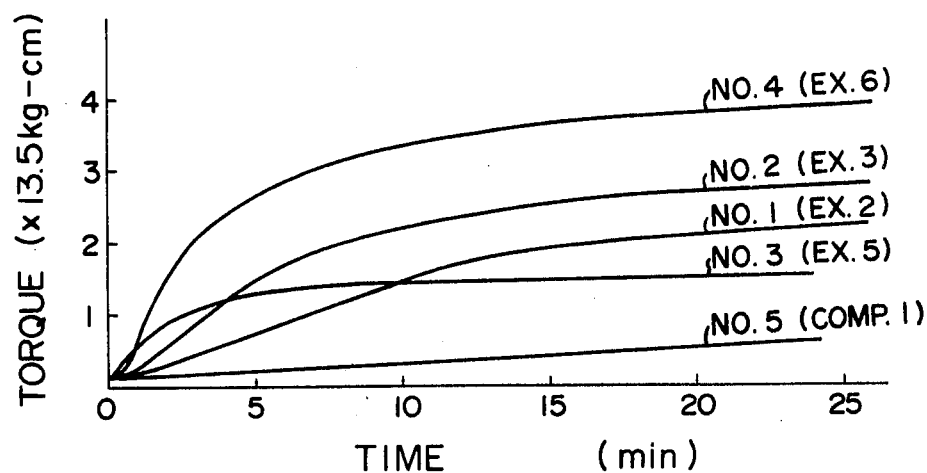

United States Patent [19] [11] 4,165,416
Matoba et al. [45] Aug. 21, 1979

[54] CURED OR UNCURED CHLORINATED POLYETHYLENE COMPOSITION AND PROCESS FOR CURING UNCURED CHLORINATED POLYETHYLENE

[75] Inventors: Yasuo Matoba, Suita; Akira Hashimoto, Itami; Mikio Sugahara, Kawanishi, all of Japan

[73] Assignee: Osaka Soda Co. Ltd., Osaka, Japan

[21] Appl. No.: 781,300

[22] Filed: Mar. 25, 1977

[30] Foreign Application Priority Data

Aug. 2, 1976 [JP] Japan .................................. 51/92638
Aug. 24, 1976 [JP] Japan .................................. 51/101377
Aug. 24, 1976 [JP] Japan .................................. 51/101378
Jan. 24, 1977 [JP] Japan .................................. 52/6962

[51] Int. Cl.² .......................... C08K 5/37; C08J 3/24
[52] U.S. Cl. ................... 525/346; 525/348; 525/350; 525/335; 260/42.21
[58] Field of Search ..................... 526/17, 30, 33, 35

[56] References Cited

U.S. PATENT DOCUMENTS

2,804,450  8/1957  Naylor ........................... 260/79.5 B
3,397,174  8/1968  Parker ............................. 260/45.9
3,919,143  11/1975  Morris ............................ 260/18 R

*Primary Examiner*—C. A. Henderson
*Attorney, Agent, or Firm*—Sherman & Shalloway

[57] ABSTRACT

A cured or uncured chlorinated polyethylene composition free from hexamethylphosphoric triamide complex comprising (A) chlorinated polyethylene, (B) a mercaptotriazine as cross-linking agent, (C) a cross-linking accelerator selected from the group consisting of specified dithiocarbamic compounds, secondary and tertiary amines, and the carboxylates, mercaptothiazole salts, dithiocarbamates and dithiophosphates of said secondary and tertiary amines and the benzothiazylsulfenamides of said secondary amines, and (D) an acid acceptor of metal compounds; as well as a process for curing uncured chlorinated polyethylene which comprises heating same in the absence of hexamethylphosphoric triamide complex in the presence of (B), (C) and (D) at a temperature of about 120° to about 200° C.

5 Claims, 4 Drawing Figures

CURED OR UNCURED CHLORINATED POLYETHYLENE COMPOSITION AND PROCESS FOR CURING UNCURED CHLORINATED POLYETHYLENE

This invention relates to a cured chlorinated polyethylene composition having superior mechanical properties such as low permanent compression set and other superior properties and also to an uncured chlorinated polyethylene composition which exhibits such improved properties after curing. The invention also relates to a process for curing an uncured chlorinated polyethylene composition at an improved stable rate of cure by heating, whereby these improved properties can be imparted to chlorinated polyethylene at relatively low temperatures and within relatively short periods of time without involving any operational difficulties.

Chlorinated polyethylene, particularly, substantially amorphous rubbery chlorinated polyethylene having a chlorine content of 20–50%, is a useful elastomeric material, and upon being sufficiently cured, becomes a rubbery material having superior mechanical properties, and resistances to heat, weather, ozone, chemicals and oil.

In order to cure chlorinated polyethylene, various methods using peroxides, thiourea derivatives and thiuram sulfides, for example, have heretofore been suggested. The methods relying on the use of thiourea derivatives and thiuram sulfides have the defect that their rate of cure is very slow and can scarcely afford cured products having satisfactory properties as rubber.

The method using peroxides is considered to give the best cured product among these methods. However, the peroxides cause various troubles during their handling or with regard to curing conditions, such as the danger involved in handling low temperature-decomposable peroxides, the disadvantage of the rise of the curing temperature caused by high temperature-decomposable peroxides, and the obstruction of curing in the presence of oxygen. Accordingly, it has been very difficult by the prior art to provide a cured chlorinated polyethylene composition which is useful as a rubbery material having satisfactory properties.

With a view to overcoming the foregoing disadvantages and drawbacks, of the present inventors and other co-inventors have proposed a cured or uncured chlorinated polyethylene composition having improved properties comprising
(1) chlorinated polyethylene,
(2) a complex formed between hexamethylphosphoric triamide and a member selected from the group consisting of carboxylic acids, cyanuric acid, substituted or unsubstituted phenols, alcohols and metal salts, and
(3) a member selected from the group consisting of (a) a mercaptotriazine, (b) a thiuram disulfide and (c) sulfur, and an improved process for curing uncured chlorinated polyethylene by heating same in the presence of the foregoing (2) and (3) (U.S. patent application Ser. No. 683,678).

The curing system of the above suggestion does demonstrate improved properties. However, it has been found that there is still room for improvement. The point that needs improvement is that in the curing system of the foregoing suggestion the rate of cure tends to be adversely affected by such additives as reinforcing agents, plasticizers and other that may be added to the chlorinated polyethylene composition. It was found that when the amount used of the additives was increased for recovering the desired rate of cure, at times there was the possibility of setting up a bleeding phenomenon, although the rate of cure could be recovered.

Further, researches by us with the view of surmounting the foregoing disadvantages led to the discovery that the disadvantage resulting from the addition of other additives could be overcome, and an improved chlorinated polyethylene composition free from the hexamethylphosphoric triamide complex could be obtained at a superior and stable rate of cure without the bleeding phenomenon being set up.

It is therefore an object of this invention to provide a cured or uncured chlorinated polyethylene composition having improved properties.

Another object of the invention is to provide a process for curing the foregoing uncured chlorinated polyethylene composition by which process the above-indicated desirable properties are bestowed thereon.

Other objects and advantages will become apparent from the following description.

The chlorinated polyethylene composition of this invention is characterized by containing the components (A), (B), (C) and (D), while being free from the hexamethylphosphoric triamide complex.

The chlorinated polyethylene (A) is well known, and can be obtained by the after-chlorination of polyethylene by known methods. Usually, it is preferred to use chlorinated polyethylene having a chlorine content of about 20 to 50%, more preferably 25 to 45%. For example, chlorinated polyethylene prepared by chlorinating polyethylene having a molecular weight of about 20,000 to about 500,000 is preferred.

The component (B) used in this invention is a cross-linking agent selected from the group consisting of a mercaptotriazine of the formula

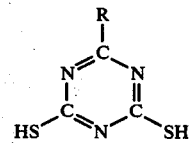

wherein R is a member selected from the group consisting of a mercapto group, alkylamino groups with the alkyl moiety containing 1 to 8 carbon atoms, dialkylamino groups with the alkyl moiety containing 1 to 8 carbon atoms, cycloalkylamino groups with the cycloalkyl moiety containing 6 to 8 carbon atoms, dicycloalkylamino groups with the alkyl moiety containing 6 to 8 carbon atoms, arylamino groups, preferably phenyl, p-tolyl and p-methoxyphenyl, N-aryl-N-alkylamino groups with the alkyl moiety containing 1 to 8 carbon atoms, the aryl being preferably phenyl, p-tolyl and p-methoxyphenyl, and alkoxy groups containing 1 to 8 carbon atoms.

Specific examples of the mercaptotriazine of the above formula are 1,3,5-trithiocyanuric acid, 1-methoxy-3,5-dimercaptotriazine, 1-diethylamino-3,5-dimercaptotriazine, 1-dibutylamino-3,5-dimercaptotriazine, 1-hexylamino-3,5-dimercaptotriazine, 1-cyclohexylamino-3,5-dimercaptotriazine and 1-phenylamino-3,5-dimercaptotriazine.

The component (C) used in this invention is a cross-linking accelerator selected from the group consisting of the compounds of the following formulas (i) and (ii), namely, a dithiocarbamic compound of the formula

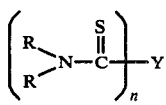

wherein Y is a member selected from the group consisting of $-(S)_x$ where x is an integer 1-8, $-SM_1$ where $M_1$ is an alkali metal atom, $-SM_2S-$ where $M_2$ is a bivalent metal atom,

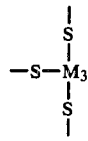

where $M_3$ is a trivalent metal atom, and

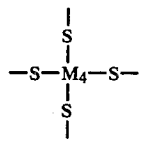

where $M_4$ is a tetravalent metal atom; n is 2 in the case of $-(S)_x$, 1 in the case of $-SM_1$, 2 in the case of $-SM_2S-$, 3 in the case of

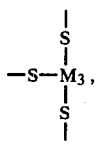

and 4 in the case of

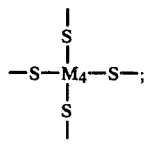

and the plurality of R's, which may be the same or different, are each groups selected from the group consisting of $C_1-C_{12}$ alkyl groups, $C_3-C_{12}$ cycloalkyl groups, $C_7-C_{12}$ aralkyl groups and $C_6-C_{12}$ aryl groups, which two R's taken together with the same N atom to which they are attached may form a nitrogen-containing ring, e.g. piperidino, piperadino, pyrrolidino or morpholino; a secondary or tertiary amine of the formula

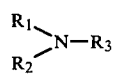

where $R_1$, $R_2$ and $R_3$ are each a member selected from the group consisting of hydrogen atom, $C_1-C_{12}$ alkyl groups, $C_3-C_{12}$ cycloalkyl groups and $C_7-C_{12}$ aralkyl groups, at least two of which $R_1-R_3$ are members other than hydrogen, which $R_1$ and $R_2$, or $R_1$ and $R_2$, and $R_2$ and $R_3$ may taken together form a $C_4-C_6$ hydrocarbon ring, which hydrocarbon ring may also contain a hetero atom and form a heterocyclic ring; and the carboxylates, mercaptothiazole salts, dithiocarbamates and dithiophosphates of said secondary or tertiary amine and the benzothiazylsulfenamides of said secondary amine.

Of the dithiocarbamic compounds of formula (i), those in which Y is $-(S)_x$ where x is an integer 1-8, and n is 2, i.e., the compounds of the formula

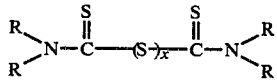

include such, for example, as tetramethylthiuram monosulfide, tetramethylthiuram disulfide, tetraethylthiuram disulfide, tetrabutylthiuram monosulfide, tetrabutylthiuram disulfide, N,N'-dimethyl-N,N'-diphenylthiuram disulfide, dipentamethylenethiuram disulfide, dipentamethylenethiuram tetrasulfide and dipentamethylenethiuram hexasulfide. On the other hand, of the dithiocarbamic compounds of formula (i), those in which Y is $-SM_1$ where $M_1$ is an alkali metal atom, e.g. Na or K, and n is 1, i.e., the compounds of the formula

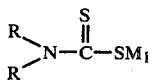

include such, for example, as sodium dimethyldithiocarbamate, sodium diethyldithiocarbamate, sodium di-n-butyldithiocarbamate, potassium dimethyldithiocarbamate and potassium di-n-butyldithiocarbamate. Of the dithiocarbamic compounds of formula (i), those in which Y is $-SM_2S-$, and n is 2, i.e., the compounds of the formula

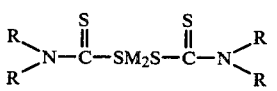

include such, for example, as lead dimethyldithiocarbamate, lead pentamethylenedithiocarbamate, lead ethylphenyldithiocarbamate, zinc dimethyldithiocarbamate, zinc diethyldithiocarbamate, zinc di-n-butyldithiocarbamate, zinc dibenzyldithiocarbamate, zinc N-pentamethylenedithiocarbamate, zinc ethylphenyldithiocarbamate, cadmium diethyldithiocarbamate, cadmium pentamethylenedithiocarbamate, copper dimethyldithiocarbamate and bismuth dimethyldithiocarbamate. Of the dithiocarbamic compounds of formula (i), those in which Y is

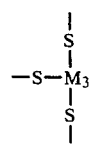

where M is a trivalent metal atom, e.g. $Fe^{III}$, and n is 3, i.e., the compounds of formula

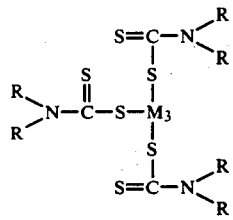
(i)-4 include such, for example, as iron dimethyldithiocarbamate. On the other hand, of the dithiocarbamic compounds of formula (i), those in which Y is

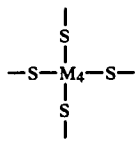

where $M_4$ is a tetravalent atom, e.g. Se or Fe, and n is 4, i.e., the compounds of the formula

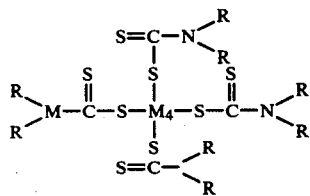
(i)-5 include such, for example, as selenium dimethyldithiocarbamate, selenium diethyldithiocarbamate and tellurium diethyldithiocarbamate.

Of the foregoing component (C), the secondary amines of formula (ii) include such, for example, as dimethylamine, diethylamine, dipropylamines, dibutylamines, dihexylamines, dioctylamines, dilaurylamines, dicyclohexylamine, morpholine, piperazine, piperidine and picoline. The tertiary amines of formula (ii) include such, for example, as trimethylamine, triethylamine, tripropylamines, tributylamines, dicyclohexylmethylamine, dibutylmethylamine and triethylene diamine. Further, the compounds of the group consisting of those of formula (ii) used in the present invention may also be the carboxylates, mercaptothiazole salts, dithiocarbamates and dithiophosphates of the aforementioned secondary and tertiary amines, or the benzothiazylsulfenamides of said secondary amines. As the carboxylic acids of the foregoing carboxylates, mention can be made of the $C_2$-$C_{24}$ mono- or dicarboxylic acids. Examples of these carboxylates include those of such aliphatic monocarboxylic acids as acetic acid, acrylic acid, caprylic acid, lauric acid and stearic acid, such aliphatic dicarboxylic acids as succinic acid, adipic acid, azelaic acid and sebacic acid, such alicyclic dicarboxylic acids as hexahydrophthalic acid, such aromatic monocarboxylic acids as benzoic acid and hydroxybenzoic acid and such aromatic dicarboxylic acids as phthalic acid, the monoalkyl esters of dicarboxylic acids such as monobutyl succinate and monooctyl phthalate. On the other hand, as the mercaptothiazole of the mercaptothiazole salts, preferred is 2-mercaptobenzothiazole, while as the dithiophosphoric acid of the dithiophosphate, preferred is O,O-dialkyldithiophosphoric acid. As specific examples of the O,O-dialkyldithiophosphoric acids, mention can be made of such acids as O,O-dibutyldithiophosphoric acid, O,O-dioctyldithiophosphoric acid, O,O-dilauryldithiophosphoric acid and O,O-distearyldithiophosphoric acid.

The component (D) used in this invention is an acid acceptor of a metal compound. As preferred examples, included are the compounds of the group consisting of the oxides, hydroxides, carbonates, carboxylates, silicates, borates and phosphites of a metal of group II of the periodic table of elements, and the oxides, basic carbonates, basic carboxylates, basic silicates, basic phosphites, basic sulfites and tribasic sulfates of a metal of group IVa of the periodic table. As preferred examples of the foregoing metals, there can be named magnesium, calcium, barium, zinc, tin and lead. Specific examples of these compounds are magnesia, magnesium hydroxide, barium hydroxide, magnesium borate, magnesium carbonate, magnesium stearate, barium carbonate, barium oxide, quick lime, slacked lime, calcium carbonate, calcium silicate, calcium stearate, zinc stearate, calcium phthalate, calcium citrate, magnesium phosphite, calcium phosphite, zinc white, tin oxide, litharge, red lead, white lead, dibasic lead phthalate, dibasic lead carbonate, tin stearate, basic lead silicate, basic lead phosphite, basic tin phosphite, basic lead sulfite and tribasic lead sulfite.

In this invention, the preferred proportions of the components (B), (C) and (D) based on 100 parts by weight of the component (A) are respectively about 0.1 to about 5 parts by weight, more preferably about 0.5 to about 3 parts by weight; about 0.1 to about 5 parts by weight, more preferably about 1 to about 4 parts by weight; and about 1 to about 50 parts by weight, more preferably about 3 to about 20 parts by weight.

The chlorinated polyethylene composition of this invention may further contain various additives known in the art, for example, plasticizers, reinforcing agents or fillers, stabilizers, antioxidants, lubricants, tackifiers, pigments and fire retardants. Examples of the plasticizers are the esters of phosphoric acid or carboxylic acids, polyethers, chlorinated paraffin, and aliphatic or aromatic hydrocarbons. The plasticizers can be used in an amount of about 0.1 to about 100 parts by weight per 100 parts by weight of chlorinated polyethylene. Examples of the reinforcing agents or fillers are carbon black, white carbon, various silicate salts, carbonates, sulfates, and phenolic resins. They can be used in an amount of about 0.1 to about 100 parts by weight per 100 parts by weight of the chlorinated polyethylene. The stabilizers include, for example, the epoxy compounds and organotin compounds, which are used in an amount of about 1 to about 10 parts by weight per 100 parts by weight of the chlorinated polyethylene. Examples of the antioxidants are the phenol derivatives, amine derivatives, phosphorous acid esters, mercapto derivatives and dialkyl dithiocarbamic acid salts; they are used in an amount of about 0.1 to about 10 parts by weight per 100 parts by weight of the chlorinated polyethylene. Examples of the lubricants are long-chain aliphatic carboxylic acids or long-chain aliphatic carboxylic acid salts, and they can be used in an amount of about 0.1 to about 5% by weight per 100 parts by weight, of the chlorinated polyethylene. Examples of the tackifiers are alkyl phenol/formaldehyde resin, alkylphenol/acetylene resins, terpene resins and rosin, and they are used in an amount of about 0.1 to about 10 parts by weight per 100 parts by weight of the chlorinated polyethylene. The pigments include, for example, the inorganic pigments such as flowers of zinc (zinc oxide), titanium white, red iron oxide, chrome yellow or ultramarine, and the organic pigments such as phthalocyanine pigments or azo pigments, which are used in an amount of about 0.1 to about 50 parts by weight per 100 parts by weight of the chlorinated polyethylene. Examples of the fire retardants are antimony oxide and phosphoric acid esters, and they can be used in an amount of about 1 to about 30 parts by weight per 100 parts by weight of the chlorinated polyethylene.

The chlorinated polyethylene composition of this invention can be produced by compounding the components (A), (B), (C), (D) and optionally other additives uniformly in an optional sequence. There is no particular restriction as to the method by which the compounding is carried out, and any conventional technique known to the art, such as mastication by open rolls, various blenders, or various kneaders, can be utilized as desired.

The uncured composition so obtained is heat-cured in the desired shape at a temperaure of about 120° to about 200° C. in the absence of hexamethylphosphoric triamide complex to form a cured composition. The cure can be performed for a period of about 0.5 minutes to about 120 minutes. Thus, according to this invention, there is provided a process for curing chlorinated polyethylene which comprises heating uncured chlorinated polyethylene in the presence of a curing agent and in the absence of hexamethylphosphoric triamide complex, wherein the uncured chlorinated polyethylene is heated at a temperature of about 120° to about 200° C. in the copresence of the components (B), (C) and (D), usually together with the other additives described above.

There is no particular restriction as to the means by which the cure is carried out, and various molding and curing methods, such as compression molding using a mold, injection molding, or heating in a steam curing tank, an air bath or a curing device utilizing infrared rays or electromagnetic waves, can be utilized.

The uncured composition of the present invention can also be used for blending with other rubber components.

The following examples will serve to more fully describe several modes of practicing the present invention.

EXAMPLES 1 TO 8 AND COMPARATIVE EXAMPLES 1 TO 4

The ingredients shown in Table 1 were kneaded for 15 minutes on mixing rolls at 80° C. and formed into a sheet. The sheet was press-formed in a mold at 160° C. and 80 kg/cm$^2$ for 30 minutes. The properties of the cured sheeted products were determined and shown in Table 2.

The cure curve of the products were determined using a JSR-type curelastometer at 160° C. with an amplitude angle of 3°, and the results are shown in FIG. 1.

FIG. 1 shows cure curves Nos. 1, 2, 3, 4 and 5, which are those of the products obtained in Examples 2, 3, 5, 6 and Comparative Example 1, respectively.

Table 1

| | | (parts by weight) | | | | | | | | | | | |
|---|---|---|---|---|---|---|---|---|---|---|---|---|---|
| | | Example | | | | | | | | Comparative Example | | | |
| | Run | 1 | 2 | 3 | 4 | 5 | 6 | 7 | 8 | 1 | 2 | 3 | 4 |
| A | Chlorinated polyethylene (chlorine content 40 wt. %) (1) | 100 | 100 | 100 | 100 | 100 | 100 | | 100 | 100 | 100 | 100 | 100 |
| | Chlorinated polyethylene (chlorine content 35 wt. %) (2) | | | | | | | 100 | | | | | |
| Other additives | SRF carbon (3) | 40 | 40 | 40 | 40 | 40 | 40 | 40 | 40 | 40 | 40 | 40 | 40 |
| | Diisodecyl adipate (4) | 20 | 20 | 20 | 20 | 20 | 20 | 20 | 20 | 20 | 20 | 20 | 20 |
| D | Magnesium oxide | 10 | 10 | 10 | 10 | 10 | 10 | 10 | | 10 | 10 | 10 | 10 |
| | Calcium hydroxide | | | | | | | | 5 | | | | |
| B | Trithiocyanuric acid | 1.8 | 1.8 | 1.8 | | | 1.5 | 1.0 | 1.8 | | 1.8 | | |
| | 1-Phenylamino-3,5-dimercapto-triazine | | | | 2.4 | | | | | | | 2.4 | |
| | 1-Dibutylamino-3,5-dimercapto-triazine | | | | | 1.4 | | | | | | | 1.4 |
| C | Tetramethylthiuram monosulfide | 2.1 | | | | | | | | | | | |
| | Dipentamethylenethiuram tetrasulfide | | 1.9 | | | | | | | | | | |
| | Tellurium diethyldithiocarbamate | | | 1.8 | 0.9 | 0.6 | | | | | | | |
| | Picoline methylpentamethylene-dithiocarbamate | | | | | | 2.3 | 1.5 | | | | | |
| | Iron dimethyldithiocarbamate | | | | | | | | 2.1 | | | | |
| | 2-Mercaptoimidazoline | | | | | | | | | 4 | | | |

Notes
(1) DAISOLAC MR-104 (a product of Osaka Soda Co., Ltd.)
(2) DAISOLAC H-135A (a product of Osaka Soda Co., Ltd.)
(3) Seast S (a product of Tokai Carbon Co., Ltd.)
(4) Vinycizer #50 (a product of Kao Soap Co., Ltd.)

Table 2

| Run | Modulus at 100% (kg/cm$^2$) | Modulus at 300% (kg/cm$^2$) | Tensile strength (kg/cm$^2$) | Break elongation (%) | Hardness (JISA) | Tension$^{(1)}$ set (%) | Compression$^{(2)}$ set (%) |
|---|---|---|---|---|---|---|---|
| Example 1 | 23 | 75 | 174 | 650 | 67 | 14.8 | 73.1 |
| Example 2 | 29 | 107 | 242 | 515 | 67 | 7.8 | 71.5 |
| Example 3 | 40 | 153 | 226 | 425 | 70 | 6.6 | 55.6 |
| Example 4 | 24 | 90 | 177 | 610 | 66 | 13.1 | 70.0 |

Table 2-continued

| Run | Modulus at 100% (kg/cm²) | Modulus at 300% (kg/cm²) | Tensile strength (kg/cm²) | Break elongation (%) | Hardness (JISA) | Tension[1] set (%) | Compression[2] set (%) |
|---|---|---|---|---|---|---|---|
| Example 5 | 25 | 94 | 210 | 580 | 66 | 9.1 | 64.1 |
| Example 6 | 48 | 171 | 223 | 320 | 71 | 5.6 | 37.0 |
| Example 7 | 35 | 144 | 231 | 400 | 70 | 8.4 | 51.4 |
| Example 8 | 27 | 91 | 153 | 575 | 73 | 15.5 | — |
| Comparative Example 1 | 21 | 65 | 92 | 475 | 67 | 24.4 | 98.0 |
| Comparative Example 2 | Cure does not proceed. | | | | | | |
| Comparative Example 3 | Cure does not proceed. | | | | | | |
| Comparative Example 4 | 17 | 57 | 149 | 700 | 63 | 26.5 | 78.5 |

Notes
[1] Determined in accordance with JIS Method 6301.
[2] 120° C. × 70 hours, 25% compression.

EXAMPLES 9–16 AND COMPARATIVE EXAMPLES 5–8

Figure 2:
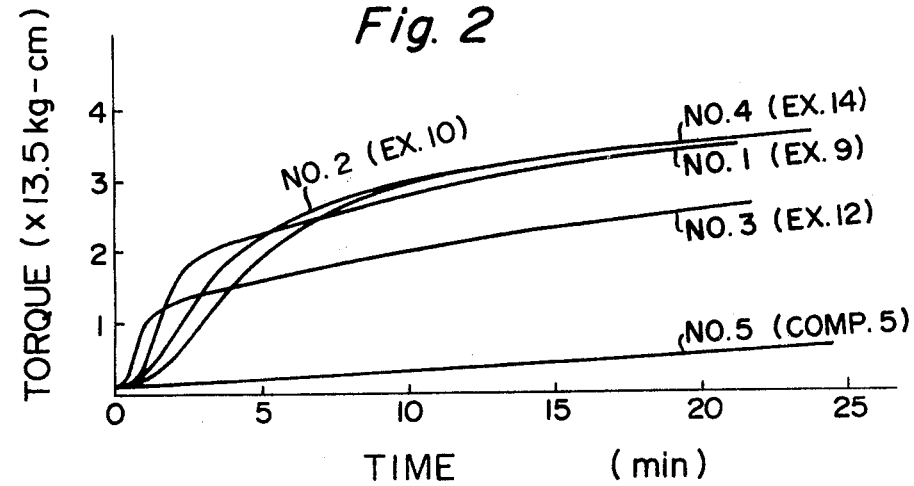

The experiments were conducted as in Examples 1–8 but using the ingredients shown in Table 3, below, to obtain the results shown in Table 4, below. Cure curves as shown in FIG. 1 are shown in FIG. 2 for the products obtained in Example 9 (curve No. 1 of FIG. 2), Example 10 (curve No. 2 of FIG. 2), Example 12 (curve No. 3 of FIG. 2), Example 14 (curve No. 4 of FIG. 2) and Comparative Example 5 (curve No. 5 of FIG. 2).

TABLE 3

| | | Example | | | | | | | | Comparative Example | | | |
|---|---|---|---|---|---|---|---|---|---|---|---|---|---|
| | Run | 9 | 10 | 11 | 12 | 13 | 14 | 15 | 16 | 5 | 6 | 7 | 8 |
| A | Chlorinated polyethylene (chlorine content 40 wt. %)[1] | 100 | 100 | 100 | 100 | 100 | 100 | 100 | | 100 | 100 | 100 | 100 |
| | Chlorinated polyethylene (chlorine content 35 wt. %)[2] | | | | | | | | 100 | | | | |
| Other additives | SRF carbon[3] | 40 | 40 | 40 | 40 | 40 | 40 | 40 | 40 | 40 | 40 | 40 | 40 |
| | Diisodecyl adipate[4] | 20 | 20 | 20 | 20 | 20 | 20 | 20 | 20 | 20 | 20 | 20 | 20 |
| D | Magnesium oxide | 10 | 10 | 10 | 10 | 10 | 10 | | 10 | 10 | 10 | 10 | 10 |
| | Calcium hydroxide | | | | | | | 5 | | | | | |
| B | 1,3,5-Trithiocyanuric acid | 1.5 | 1.5 | | | 1.5 | 1.5 | 1.5 | | | 1.8 | | |
| | 1-Phenylamino-3,5-dimercapto-triazine | | | 2.4 | | | | | * | | | 2.4 | |
| | 1-Dibutylamino-3,5-dimercapto-triazine | | | | 1.4 | | | | | | | | 1.4 |
| C | Mono-n-butylamine | | | | | | | | | | | | |
| | Di-n-butylamine | 3.8 | | | | | | | | | | | |
| | Tri-n-butylamine | | 5.5 | | | | | | | | | | |
| | Dicyclohexylamine | | | 2.7 | | | | | | | | | |
| | Diisopropylamine | | | | 1.5 | | | | | | | | |
| | Dicyclohexylamine salt of 2-mercaptobenzothiazole | | | | | 3.0 | | | | | | | |
| | Di-n-butylammonium oleate | | | | | | 3.5 | | | | | | |
| | Bis(0,0-distearyl-dithiophosphoric acid) piperazine salt | | | | | | | 2.0 | | | | | |
| | 1:1 Mol mixture of 1,3,5-trithiocyanuric acid (B) and dicyclohexylamine (C) | | | | | | | | 3.0 | | | | |
| | 2-Mercaptoimidazoline | | | | | | | | | 4.0 | | | |

Notes
[1] DAISOLAC MR-104 (a product of Osaka Soda Co., Ltd.)
[2] DAISOLAC H-135A (a product of Osaka Soda Co., Ltd.)
[3] Seast S (a product of Tokai Carbon Co., Ltd.)
[4] Vinycizer #50 (a product of Kao Soap Co., Ltd.)
*Ingredient: See C column.

Table 4

| Run | Modulus at 100% (kg/cm²) | Modulus at 200% (kg/cm²) | Tensile strength (kg/cm²) | Break elongation (%) | Hardness (JISA) | Tension[1] set (%) | Compression[2] set (%) |
|---|---|---|---|---|---|---|---|
| Example 9 | 45 | 140 | 220 | 270 | 72 | 4.6 | 34 |
| " 10 | 34 | 115 | 231 | 310 | 70 | 7.1 | 39 |
| " 11 | 31 | 103 | 205 | 400 | 68 | 7.0 | 51 |
| " 12 | 32 | 107 | 200 | 390 | 68 | 6.6 | 46 |
| " 13 | 37 | 107 | 212 | 360 | 70 | 6.0 | 30 |
| " 14 | 38 | 101 | 233 | 365 | 67 | 5.7 | 42 |
| " 15 | 30 | 103 | 231 | 400 | 68 | 6.0 | 46 |
| " 16 | 37 | 105 | 230 | 380 | 72 | 5.8 | 42 |
| Comparative | | | | | | | |

Table 4-continued

| Run | | Modulus at 100% (kg/cm²) | Modulus at 200% (kg/cm²) | Tensile strength (kg/cm²) | Break elongation (%) | Hardness (JISA) | Tension[1] set (%) | Compression[2] set (%) |
|---|---|---|---|---|---|---|---|---|
| Example | 5 | 21 | 41 | 92 | 475 | 67 | 24.4 | 98 |
| " | 6 | Cure does not proceed. | | | | | | |
| " | 7 | " | | | | | | |
| " | 8 | 17 | 34 | 149 | 700 | 63 | 26.5 | 78.5 |

Notes
[1]Determined in accordance with JIS Method K 6301.
[2]120° C. × 70 hours, 25% compression.

EXAMPLES 17–21 AND COMPARATIVE EXAMPLES 9–12

Figure 3:
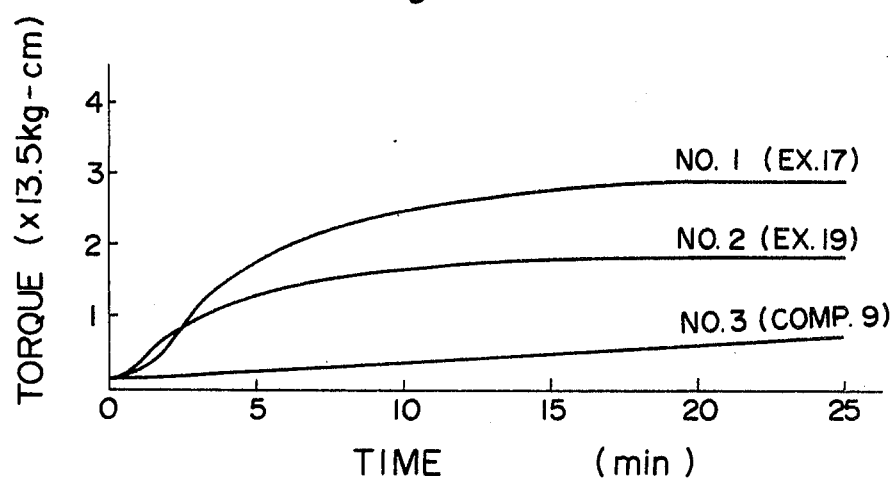

The experiments were carried out by operating as in Examples 1–8 but using the ingredients indicated in Table 5 to obtain the results shown in Table 6, below. Cure curves as shown in FIG. 1 are shown in FIG. 3 for the products obtained in Example 17 (curve No. 1 of FIG. 3), Example 19 (curve No. 2 of FIG. 3) and Comparative Example 9 (curve No. 3 of FIG. 3).

Figure 4:
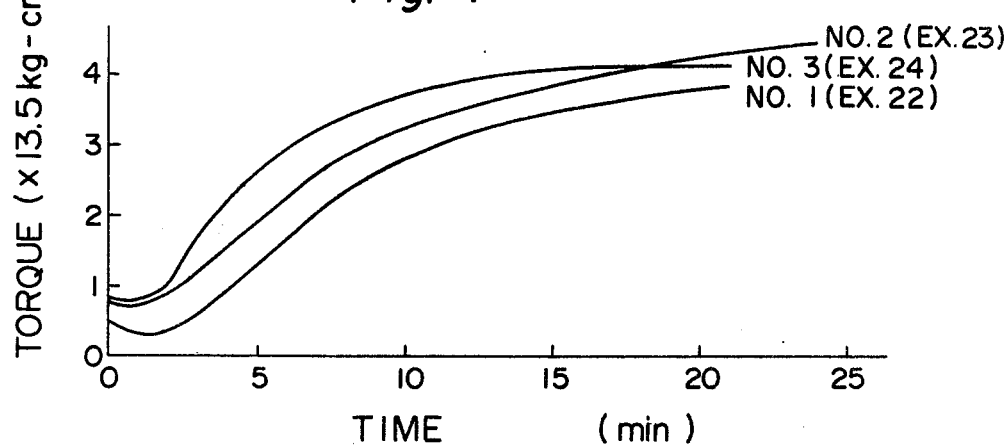

Example 22 (curve No. 1 of FIG. 4), Example 23 (curve No. 2 of FIG. 4) and Example 24 (curve No. 3 of FIG. 4).

Table 7

| Run | 22 | 23 | 24 |
|---|---|---|---|
| Chlorinated polyethylene[1] (chlorine content 40 wt. %) | 100 | 100 | — |
| Chlorinated polyethylene[2] (chlorine content 35 wt. %) | — | — | 100 |
| Finely divided calcium[3] carbonate | 100 | — | — |
| Burnt clay[4] | — | 100 | — |
| Silica[5] | — | — | 100 |
| Aromatic oil | 30 | 30 | 30 |
| Trithiocyanuric acid | 1.5 | 1.5 | 1.5 |
| Tellurium dimethyldithio- | 1.5 | — | — |

Table 5

| | Run | Example | | | | | Comparative Example | | | |
|---|---|---|---|---|---|---|---|---|---|---|
| | | 17 | 18 | 19 | 20 | 21 | 9 | 10 | 11 | 12 |
| A | Chlorinated polyethylene (chlorine content 40 wt. %)[1] | 100 | 100 | 100 | 100 | | 100 | 100 | 100 | 100 |
| | Chlorinated polyethylene (chlorine content 35 wt. %)[2] | | | | | 100 | | | | |
| Other additives | SRF carbon[3] | 40 | 40 | 40 | 40 | 40 | 40 | 40 | 40 | 40 |
| | Diisodecyl adipate[4] | 20 | 20 | 20 | 20 | 20 | 20 | 20 | 20 | 20 |
| D | Magnesium oxide | 10 | 10 | 10 | 10 | | 10 | 10 | 10 | 10 |
| | Calcium hydroxide | | | | | 5 | | | | |
| | Trithiocyanuric acid | 1.5 | | | 1.5 | 1.5 | | 1.8 | | |
| B | 1-Phenylamino-3,5-dimercaptotriazine | | 2.0 | | | | | | 2.4 | |
| | 1-Dibutylamino-3,5-dimercaptotriazine | | | 2.3 | | | | | | 1.4 |
| | N,N-dicyclohexyl-2-benzothiazyl-sulfenamide | 2.2 | 1.1 | 1.1 | | | | | | |
| C | N,N-diisopropyl-2-benzothiazyl-sulfenamide | | | | 2.3 | 2.3 | | | | |
| | N-cyclohexyl-2-benzothiazylsulfenamide | | | | | | | | | |
| | 2-Mercaptoimidazoline | | | | | | 4.0 | | | |

Notes
[1]DAISOLAC MR-104 (a product of Osaka Soda Co., Ltd.)
[2]DAISOLAC H-135A (a product of Osaka Soda Co., Ltd.)
[3]Seast S (a product of Tokai Carbon Co., Ltd.)
[4]Vinycizer #50 (a product of Kao Soap Co., Ltd.)

Table 6

| Run | | Modulus at 100% (kg/cm²) | Modulus at 300% (kg/cm²) | Tensile strength (kg/cm²) | Break elongation (%) | Hardness (JISA) | Tension[1] set (%) | Compression[2] set (%) |
|---|---|---|---|---|---|---|---|---|
| Example | 17 | 30 | 134 | 225 | 410 | 70 | 6.7 | 48.0 |
| " | 18 | 22 | 68 | 205 | 600 | 67 | 10.3 | 61.5 |
| " | 19 | 26 | 95 | 231 | 490 | 67 | 9.3 | 54.0 |
| " | 20 | 32 | 151 | 231 | 375 | 71 | 6.0 | 44.3 |
| " | 21 | 27 | 98 | 210 | 450 | 69 | 7.7 | 54.0 |
| Comparative Example | 9 | 21 | 65 | 92 | 475 | 67 | 24.4 | 98.0 |
| " | 10 | Cure does not proceed. | | | | | | |
| " | 11 | " | | | | | | |
| " | 12 | 17 | 59 | 149 | 700 | 63 | 26.5 | 78.5 |

Notes
[1]Determined in accordance with JIS Method 6301.
[2]120° C. × 70 hours, 25% compression.

EXAMPLES 22–24

The experiments were conducted by operating as in Examples 1–8 but using as the ingredients those indicated in the following Table 7 to obtain the results shown in Table 8, below. Cure curves as shown in FIG. 1 are shown in FIG. 4 for the products obtained in

Table 7-continued

| Run | 22 | 23 | 24 |
|---|---|---|---|
| carbamate | | | |
| Dicyclohexylamine salt of 2-mercaptobenzothiazole | −3.0 | — | — |
| N,N-diisopropyl-2-benzothiazylsulfenamide | — | — | 2.3 |
| Lead monooxide | 10 | — | — |
| White lead | — | 10 | — |
| Calcium silicate | — | — | 10 |

Notes
[1]DAISOLAC MR-104 (a product of Osaka Soda Co., Ltd.)
[2]DAISOLAC H-135 (a product of Osaka Soda Co., Ltd.)
[3]HAKUENKA CC (a product of Shiraishi Calcium Co., Ltd.)
[4]BURGESS #30 (a product of Burgess Pigment Company)
[5]CARPLEX 1120 (a product of Shionogi & Co., Ltd.)

Table 8

| Run | Modulus at 100% (kg/cm$^2$) | Modulus at 200% (kg/cm$^2$) | Tensile strength (kg/cm$^2$) | Break elongation (%) | Hardness (JISA) | Tension[1] set (%) | Compression[2] set (%) |
|---|---|---|---|---|---|---|---|
| Example 22 | 17 | 29 | 144 | 390 | 60 | 16 | 60 |
| " 23 | 26 | 45 | 124 | 370 | 63 | 10 | 57 |
| " 24 | 28 | 49 | 166 | 470 | 73 | 15 | 70 |

Notes
[1]Determined in accordance with JIS Method K 6301.
[2]120° C. × 70 hours, 25% compression.

What is claimed is:

1. A curable chlorinated polyethylene composition free from hexamethylphosphoric triamide complex consisting essentially of:
   (A) chlorinated polyethylene having a chlorine content of about 20 to 50%, said polyethylene having a molecular weight of about 20,000 to 500,000;
   (B) a mercaptotriazine cross-linking agent of the formula

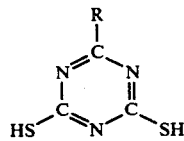

wherein R is a member selected from the group consisting of a mercapto group, alkylamino groups with the alkyl moiety containing 1 to 8 carbon atoms, dialkylamine groups with the alkyl moiety containing 1 to 8 carbon atoms, cycloalkylamino groups with the cycloalkyl moiety containing 6 to 8 carbon atoms, dicycloalkylamino groups with the alkyl moiety containing 6 to 8 carbon atoms, arylamino groups, N-aryl-N-alkylamino groups with the alkyl moiety containing 1 to 8 carbon atoms and alkoxy groups containing 1 to 8 carbon atoms;
   (C) a cross-linking accelerator selected from the group consisting of secondary and tertiary amines of the formula

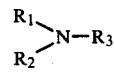

wherein $R_1$, $R_2$ and $R_3$ are each a member selected from the group consisting of hydrogen atoms, $C_1$–$C_{12}$ alkyl groups, $C_3$–$C_{12}$ cycloalkyl groups and $C_7$–$C_{12}$ aralkyl groups, at least two of which $R_1$–$R_3$ are members other than hydrogen, which $R_1$ and $R_2$, or $R_1$ and $R_2$, and $R_2$ and $R_3$ may taken together form a $C_4$–$C_6$ hydrocarbon ring, which hydrocarbon ring may also contain a hetero atom and form a heterocyclic ring; as well as the carboxylates, mercaptothiazole salts, dithiocarbamates and dithiophosphates of said secondary and tertiary amines and the benzothiazylsulfenamides of said secondary amines;
   (D) an acid acceptor of metal compounds; and
   (E) an additive selected from the group consisting of a plasticizer and a reinforcing agent, the amount of said additive being about 0.1 to about 100 parts by weight per 100 parts by weight of the chlorinated polyethylene.

2. The composition of claim 1 wherein the proportions of the components (B), (C) and (D) based on 100 parts by weight of the component (A) are respectively about 0.1 to about 5 parts by weight, about 0.1 to about 5 parts by weight and about 1 to about 50 parts by weight.

3. The composition of claim 1 wherein said acid acceptor of metal compounds is a compound selected from the group consisting of the oxides, hydroxides, carbonates, carboxylates, silicates, borates and phosphites of a metal of group II of the periodic table of elements, and the oxides, basic carbonates, basic carboxylates, basic phosphites, basic sulfites, tribasic sulfates and basic silicates of a metal of group IVa of the periodic table.

4. The composition of claim 1 which further comprises at least one additive selected from the group consisting of plasticizers, fillers, stabilizers, antioxidants, lubricants, tackifiers, pigments and fire retardants.

5. The composition of claim 4 wherein said stabilizer is used in an amount of about 1 to about 10 parts by weight, said antioxidant is used in an amount of about 0.1 to about 10 parts by weight, said lubricant is used in an amount of 0.1 to about 5 parts by weight, said pigment is used in the amount of about 0.1 to about 50 parts by weight and said fire retardant is used in an amount of about 1 to about 30 parts by weight, said parts being per 100 parts by weight of the chlorinated polyethylene.

* * * * *